United States Patent
Rawson, Sr. et al.

[19]

[11] Patent Number: 5,949,059
[45] Date of Patent: Sep. 7, 1999

[54] TAMPER EVIDENT LABELLING SYSTEM WITH EMBEDDED STORAGE DEVICE

[75] Inventors: Andrew Radcliffe Rawson, Sr., Cedar Park; Wallace Gilbert Tuten, Georgetown, both of Tex.

[73] Assignee: International Business Machines Corporation, Armonk, N.Y.

[21] Appl. No.: 08/762,375

[22] Filed: Dec. 9, 1996

[51] Int. Cl.[6] .................................................. G06K 19/00
[52] U.S. Cl. ........................................... 235/487; 235/488
[58] Field of Search ..................................... 235/384, 488, 235/492, 487; 340/540, 572, 825.54

[56] References Cited

U.S. PATENT DOCUMENTS

| | | | |
|---|---|---|---|
| 4,246,307 | 1/1981 | Trautwein | 428/43 |
| 4,796,220 | 1/1989 | Wolfe | 380/4 |
| 4,947,318 | 8/1990 | Mineo | 395/186 |
| 5,033,084 | 7/1991 | Beecher | 380/4 |
| 5,138,712 | 8/1992 | Corbin | 395/186 |
| 5,222,133 | 6/1993 | Chou et al. | 380/4 |
| 5,375,240 | 12/1994 | Grundy | 395/186 |
| 5,469,363 | 11/1995 | Saliga | 235/380 |
| 5,473,692 | 12/1995 | Davis | 380/25 |
| 5,478,991 | 12/1995 | Watanabe et al. | 235/375 |
| 5,557,096 | 9/1996 | Watanabe et al. | 235/492 |

OTHER PUBLICATIONS

Rankl et al, "Smart Card Handbook", John Wiley & Sons/Carl Hanse Verlag, pp. 266–267, 1995.
50 Ways to Touch Memory, Third Edition, Dallas Semiconductor Corporation, Dallas, Texas, Aug., 1994, pp. 1–6, 14, 26–29.

Primary Examiner—Donald Hajec
Assistant Examiner—Karl D. Frech
Attorney, Agent, or Firm—Kelly K. Kordzik; Winstead Sechrest & Minick P.C.; Richard A. Henkler

[57] ABSTRACT

A labeling system combines an indelibly inscribed visually readable serial number with an embedded electronically readable one-time programmable read-only storage device. The integration of the two in one labeling system ensures that the visually readable identification information is consistent with the electronically readable information. The labeling system is tamper evident visually and electronically. Electronic tamper evidence is provided by the construction of the label system which is designed to ensure the breaking of various internal and peripheral electrical connections associated with the embedded read-only storage device during any attempt to remove the label once it is affixed to the computer or subassembly thus identified. The integration of visual and electronic identification information eliminates the need to manually or electronically enter the identification information into the electronic storage device during a separate manufacturing process. The labeling system may be affixed to computer system enclosures, subassemblies, adapter cards, and even components mounted on such subassemblies and adapter cards.

22 Claims, 5 Drawing Sheets

TAMPER EVIDENT LABELLING SYSTEM WITH EMBEDDED STORAGE DEVICE

TECHNICAL FIELD

The present invention relates in general to identification of items, and in particular, to an apparatus for visually and electronically labeling an item.

BACKGROUND INFORMATION

Computers are rapidly proliferating in every aspect of our lives, in the home and at work. Nevertheless, computers, computer parts and components, and software remain relatively expensive. Thus, there is a need to particularly identify and track such items to maintain some aspect of control over these items. The following presents several examples of why there are needs for such control mechanisms.

Typically, a computer system is sold with numerous pieces of software stored therein. Pirating of software is quite simple and may be performed by merely copying the software from its source. The owner, or licensor, of the software usually does not intend to distribute or license their software with the assumption that it will be copied without receipt of some type of compensation. Therefore, software developers are always searching for improved methods of license verification.

Correspondingly, many software developers license their program products for use on a single computer system and then need a mechanism which allows the program as part of the license verification process to determine the machine serial number of the computer system upon which the program is currently executing. As an example, a software developer may license a program to a licensee for use on only specific computer systems identified by their machine serial number.

Software developers also need assurance that the unique machine serial number returned via the method mentioned above is in fact the serial number assigned by the manufacturer of the computer system.

Control during manufacturing of computer components and systems is also a high priority. As a result, the manufacturer of a computer system needs an automated way to assign unique machine serial numbers for order tracking and system build work-in-progress control.

Yet still further, a computer system manufacturer requires an automatic method of tracking the presence and configuration of currently installed optional subsystems to track and verify the configuration of the computer system with respect to the customer's order.

Additionally, such manufacturers need a convenient method to physically affix a machine or subassembly identification label and ensure that the visual identification number matches an electronically readable identification number. However, presently such labels are too easily removed or tampered with.

There is a further need for the owner of a computer system to have an automatic means of remotely determining the serial number of various computer systems under his/her control for the purposes of asset management Again, the machine serial number needs to be unique and must be resistant to alteration.

Computer system owners also have a need to remotely confirm the presence and configuration of optional subsystems within a computer system for the purposes of asset management.

One prior art solution for the foregoing needs is to permanently affix to a subassembly card a unique part number written to a programmable read-only electronic device attached to the card using traditional mounting techniques. This card is then subsequently installed in a computer system in a separate manufacturing process. The computer system provides a means for software to read the contents of this device either directly or via intermediary firmware. The identification number in the programmable read-only memory ("PROM") is generally not the same as the identification number assigned to the computer system as a unit. The problem with this approach is that when the electronic subassembly needs to be replaced in the field, the system identifier is changed when the replacement subassembly is installed. This forces the user to obtain new license keys for any installed software products which employ the system identifier for license verification. Also, the electronically readable identification number is not unique across computer systems manufactured by a particular computer maker or even within a machine model and type from a specific plant or manufacturer.

A second prior art solution, which is a variant of the above solution, is to make the read-only electronic device containing the system identifier pluggable. In this case, the device can be moved to the replacement subassembly when the defective one is removed This eliminates the inconvenience to the customer of obtaining new software keys for software the user already owns, but it introduces a licensing security problem in that the pluggable device is easily removed, duplicated, or placed in multiple computer systems by a person seeking to defeat the program product license verification process.

Both of these prior art implementations suffer from the problem that the storage device used to electronically contain the serial number is expensive or must be soldered or plugged into a socket which is soldered to a major electronic subassembly. The cost limits the application to the identification of either the complete computer as a unit or to only a few major subassemblies. In addition, the identification number of a major subassembly when used as the machine identification number may be non-unique.

SUMMARY OF THE INVENTION

The present invention addresses the foregoing needs by providing a labeling system that includes an electronic storage device and an electrical connection operable for providing an electrical path to information stored in the electronic storage device. The electronic storage device and electrical connection are adaptable for affixing to an object in a manner so that the electrical path is broken when an attempt is made to physically tamper with the electronic storage device.

Another embodiment of the present invention addresses the foregoing needs by implementing a labeling system combining an indelibly inscribed visually readable serial number and/or scannable information with an embedded electronically readable one-time programmable (or mask program) read-only storage device. The fact that the two identification methods are integrated in one labeling system ensures that the visually readable identification information is consistent with electronically readable information and that no separate and error-prone manufacturing step is required to make the printed information consistent with the electronic information.

One advantage of the present invention is that it is tamper evident visually and electronically. Tamper evidence is used in proving deliberate attacks upon computer security. The label of the present invention is designed from materials which cause the label to tear when an attempt is made to remove it. This provides visual tamper evidence. Electronic tamper evidence is provided by the construction of the label system which is designed to ensure that breaking of various internal and peripheral electrical connections associated with the embedded read-only storage device during any attempt to remove the label once it is affixed to the computer or subassembly thus identified.

In one form, the present invention includes a read-only storage device that provides electrical connection (a signal path) to the system or subassembly to which it is affixed via contact pads, which are an integral part of the adhesive side of the label. The system or subassembly to be thus identified provides contacts aligned with the those of the label.

The labeling system of the present invention may be affixed to a particular subassembly of a computer system and/or to various components (e.g. single in-line memory modules ("SIMMs")) implemented on a subassembly.

Alternatively, the labeling system of the present invention could be affixed to the chassis of a computer system so that the computer system only operates when the chassis is properly assembled.

In yet another alternative embodiment of the present invention, the labeling system could be affixed to the chassis of a subunit that is pluggable into an equipment rack so that numerous subunits within the rack can be polled to determine what subunits have been installed in the rack.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
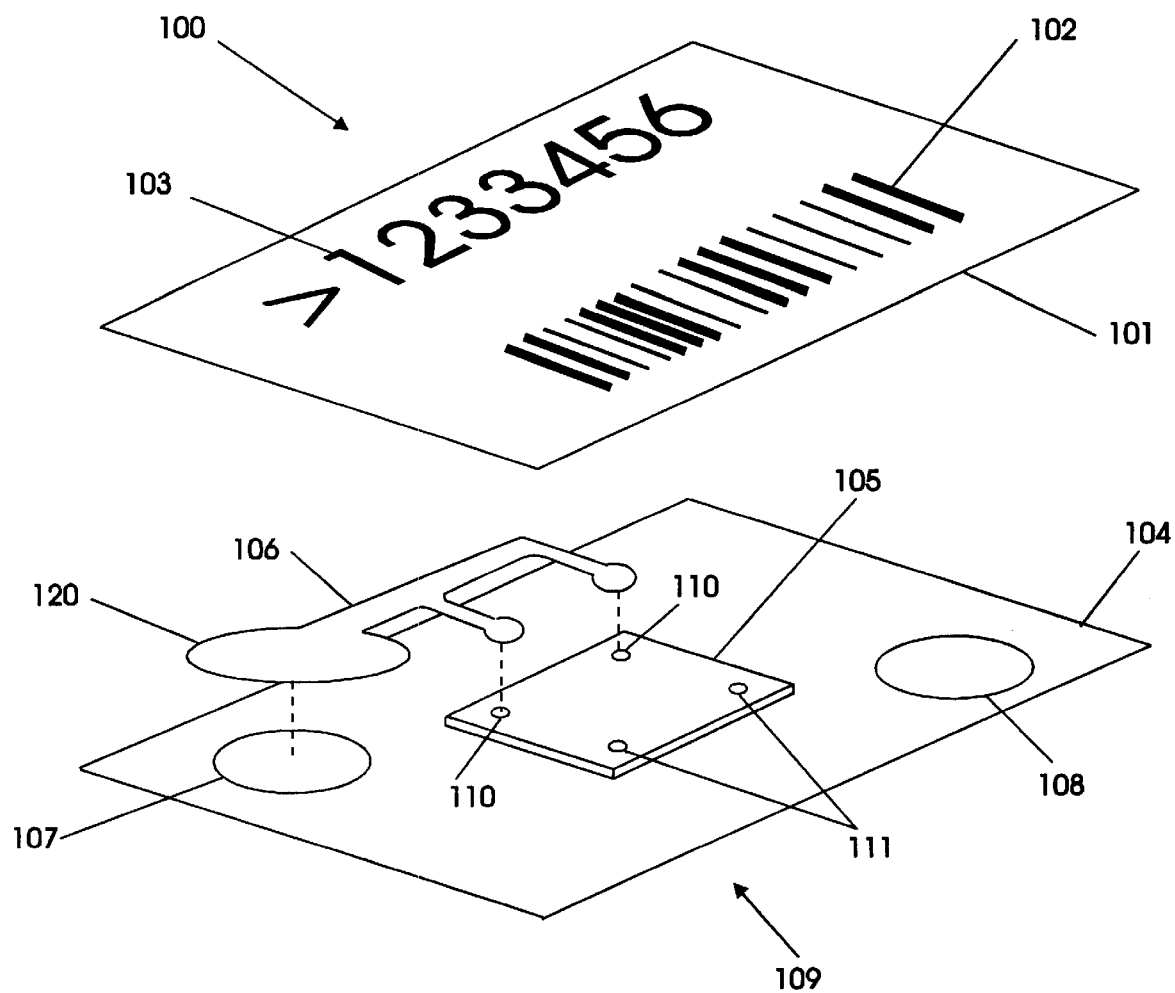
FIG. 1 illustrates an exploded view of an embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated an embodiment of the labeling system of the present invention. Labeling system (also referred to herein as a "label") 100 includes upper laminate portion 101, which may be comprised of a plastic substrate of polyimide or polyetherimide or some other type of flexible or paper-like material. The human-readable optical character recognition ("OCR") font 103 and the bar code 102 may be imprinted using high temperature resistant resin-based transfer ink. Note, any desired information may be imprinted, including no visually readable information. A top coat of epoxy with titanium dioxide may be placed on the upper surface of upper portion 101 to provide high visual contrast for the imprinting.

Font 103 and bar code 102 may correspond to each other, and may operate as an identification (serial) number.

Lower laminate portion 104 of labeling system 100 may comprise a polyimide material. Epoxy may be used to bond read-only electronic device 105 (e.g., an EPROM or PROM) to lower laminate portion 104 as well as bonding upper portion 101 to lower portion 104.

Flexible conductor trace 106 is mounted between upper laminate portion 101 and lower laminate portion 104 so that it makes contact with contacts 110 of electronic device 105. A corresponding flexible conductor trace (not shown) may also be positioned between upper laminate portion 101 and lower laminate portion 104 to contact conductors 111 on electronic device 105. Trace 106 may operate to provide a path for electronic signals to and from electronic device 105, while the other trace that is not shown and coupled to conductors 111 may provide a ground contact. That non-illustrated trace is accessible through hole 108 within lower laminate portion 104. Electrical contact to trace 106 is provided through hole 107.

A pressure sensitive adhesive is used to attach labeling system 100 to an object (see FIGS. 2–6). Such an adhesive may be an acrylic adhesive.

The result is that if an attempt is made to tamper with electronic device 105 positioned between laminate portions 101 and 104 or labeling system 100 as a whole (such as removing system 100), the adhesives utilized to construct labeling system 100 will cause it to be damaged (e.g., trace 106 is torn or broken).

Figure 2:
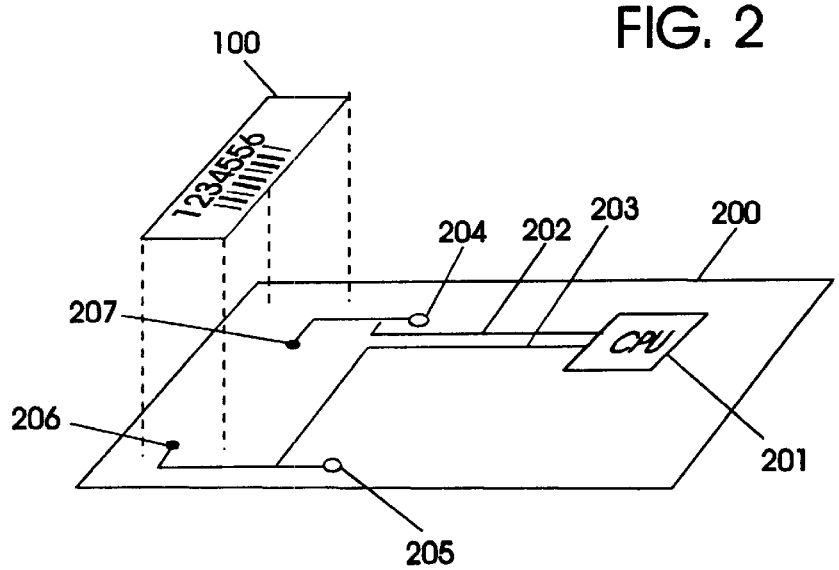
FIG. 2 illustrates an implementation of the present invention upon a computer system subassembly.

Referring next to FIG. 2, there is illustrated one embodiment of the present invention mounted on computer system subassembly 200, which may be a motherboard or some other type of printed circuit board ("PCB"), which includes various circuitry not shown for reasons of clarity, except for central processing unit ("CPU") 201.

Labeling system 100 is affixed to subassembly 200 so that hole 107 (see FIG. 1) is positioned over contact 206 and hole 108 (see FIG. 1) is positioned over contact 207. Contacts 206 and 207 may be conical to ensure that the force at the point of contact with their corresponding traces (e.g., trace 106 contacting contact 206) is sufficient to displace any adhesive used to affix labeling system 100 to subassembly 200 (unless the adhesive is masked off the label contact pads (e.g., trace 106)) or any oxide which might be present on either pad 106 or the conical mating contact 206, thus providing a low resistance electrical connection. Pad 120, hole 107, and hole 108 (see FIG. 1) are oversized allowing for slight misalignments of labeling system 100 over contacts 206 and 207 during the affixing process.

The force ensuring this contact may be provided by the elasticity of labeling system 100, or the mating contact may provide a loading spring, which is discussed in further detail below with respect to FIGS. 4–6.

Access to electronic device 105 through contacts 206 and 207 may be made through trace lines 203 and 202, respectively, by CPU 201. As a result, CPU 201 may access the information in electronic device 105 in a well-known manner. Likewise, it can be easily seen that access of electronic device 105 can be made remotely through CPU 201 when PCB 200 is coupled to a data processing system having network capabilities (see FIG. 7).

Additionally, trace lines 202 and 203 are coupled to plated-through holes 204 and 205, respectively, which provide for the capability of accessing electronic device 105 via test probes (not shown), such as during the manufacturing phase of subassembly 200.

Figure 3:
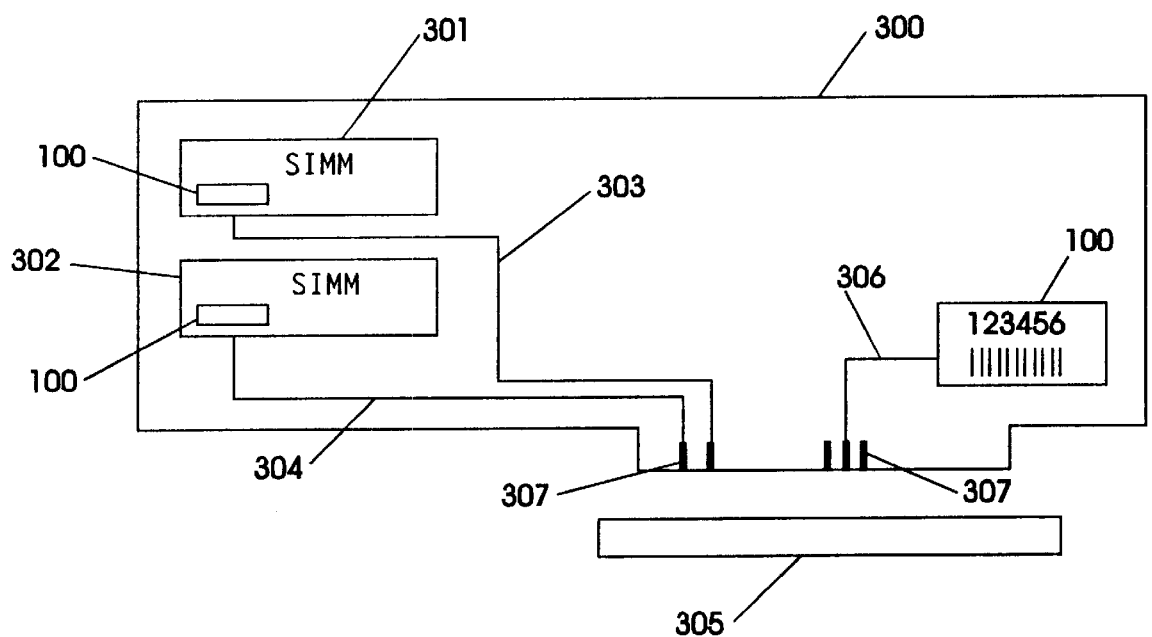
FIG. 3 illustrates an implementation of the present invention upon individual components of a computer system subassembly.
Figure 7:
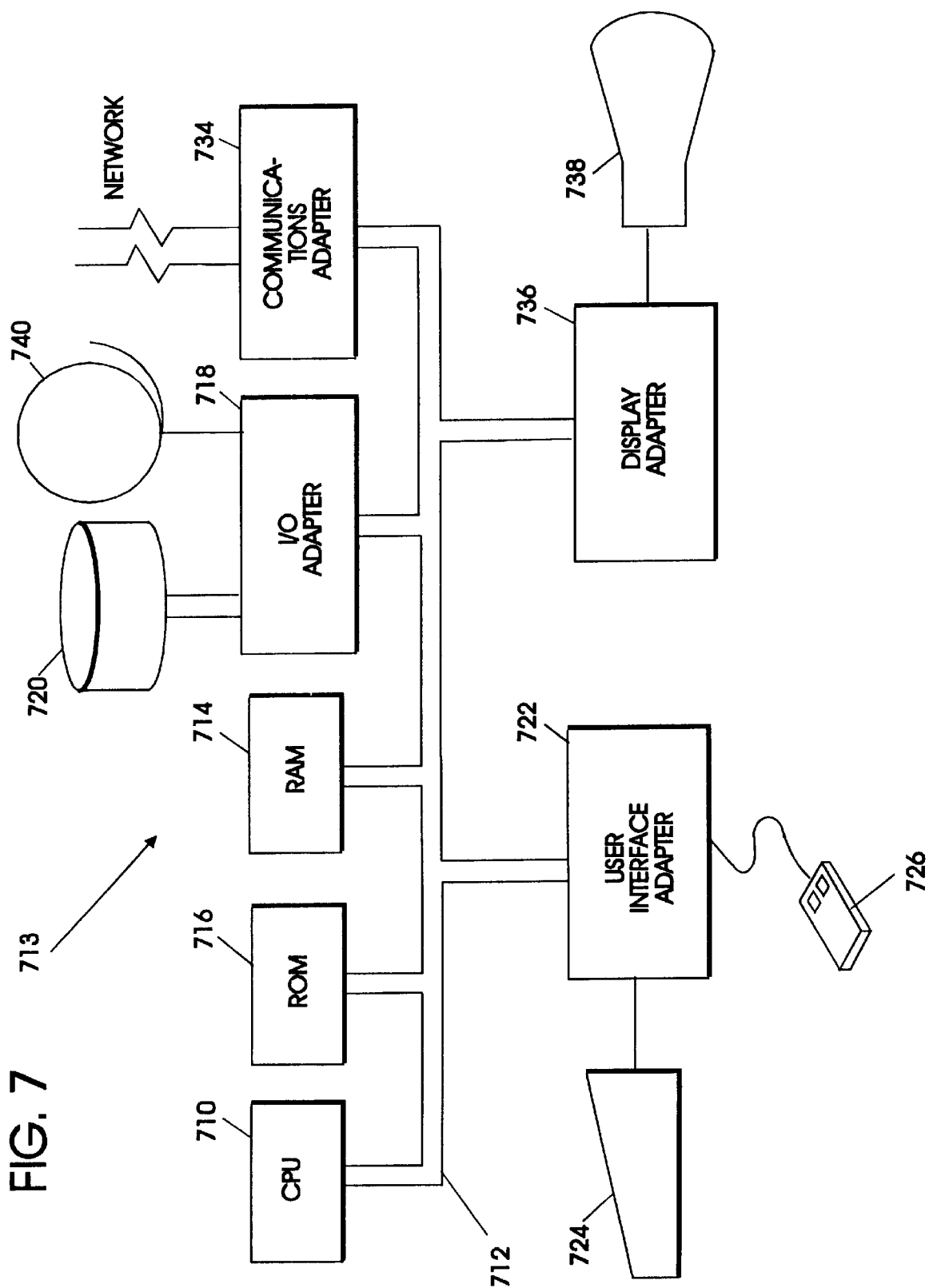
FIG. 7 illustrates a data processing system that is configurable with the present invention.

Referring next to FIG. 3, there are illustrated several alternative embodiments of the present invention. Adapter card 300, which may be inserted within a data processing system, such as system 713 illustrated in FIG. 7, is accessible when it is inserted into adapter card slot 305, which makes electrical contact with various pins 307.

In one example, labeling system 100 is affixed to the surface of adapter card 300 and accessible via trace line 306 and one of pins 307.

With such a labeling system 100, CPU 710 within data processing system 713 (see FIG. 7), may poll adapter card 300 to determine that it is installed within system 713 and its identification information stored in labeling system 100.

One skilled in the art will also realize that other information may be stored on electronic device 105 for access by computer system 713.

An alternative embodiment is also illustrated in FIG. 3 where single in-line memory modules ("SIMMs") 301 and 302 are installed on adapter card 300. Each of SIMMs 301 and 302 has an individual labeling system 100 affixed thereto and accessible by trace lines 303 and 304, which are coupled to adapter card pins 307. Thus, it can be easily seen that individual components on an adapter card 300 are also identifiable using labeling system 100. Alternatively, labeling systems 100 on SIMMs 301 and 302 could be coupled to a processor or controller (not shown) on adapter card 300.

Figure 4:
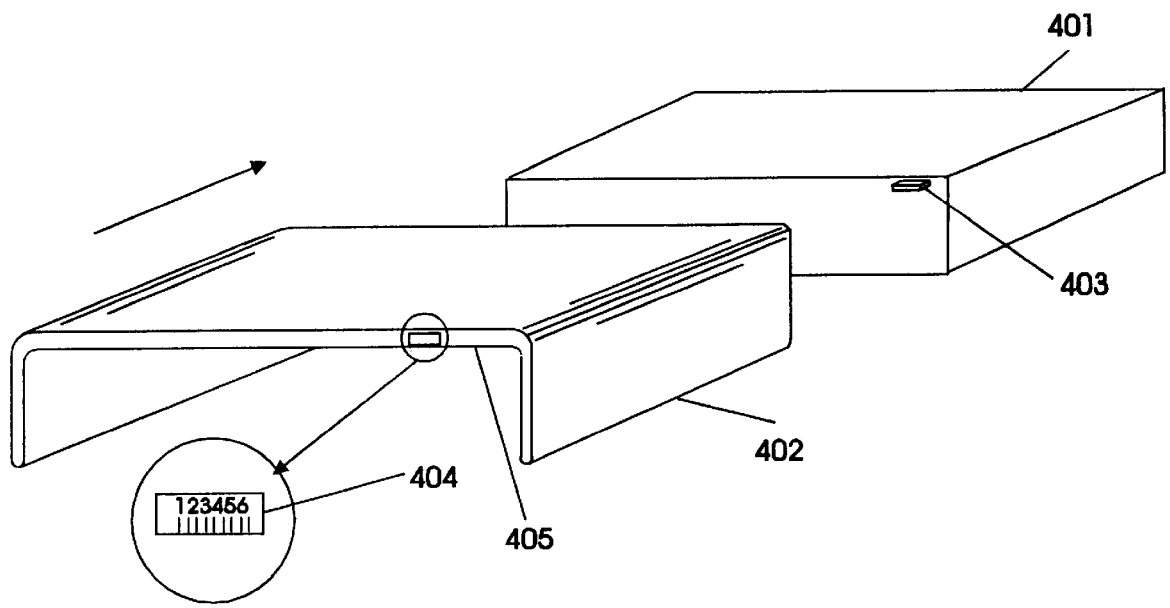
FIGS. 4, 5 and 6 illustrate an implementation of the present invention upon a computer system chassis.

Referring next to FIG. 4, there is illustrated another alternative embodiment of the present invention where labeling system 404 is affixed to cover 402, which slides over chassis 401 of a computer system (not shown). Labeling system 404 is similar to labeling system 100 and may be affixed to cover 402 so that part of labeling system 404 folds over the edge of lip 405 of cover 402 so that contact pad 106 is exposed on the interior surface of cover 402. In this embodiment, contact pad 106 is exposed on the same side of labeling system 404 as the visually readable printing, which may be performed by having hole 107 through upper laminate portion 101. The ground contact required by read-only electronic device 105 is made with cover 402.

When cover 402 is closed over chassis 401, contact probe 403 makes electrical contact with conductor trace 106 on labeling system 404, thus making communication possible with electronic device 105.

Figure 6:
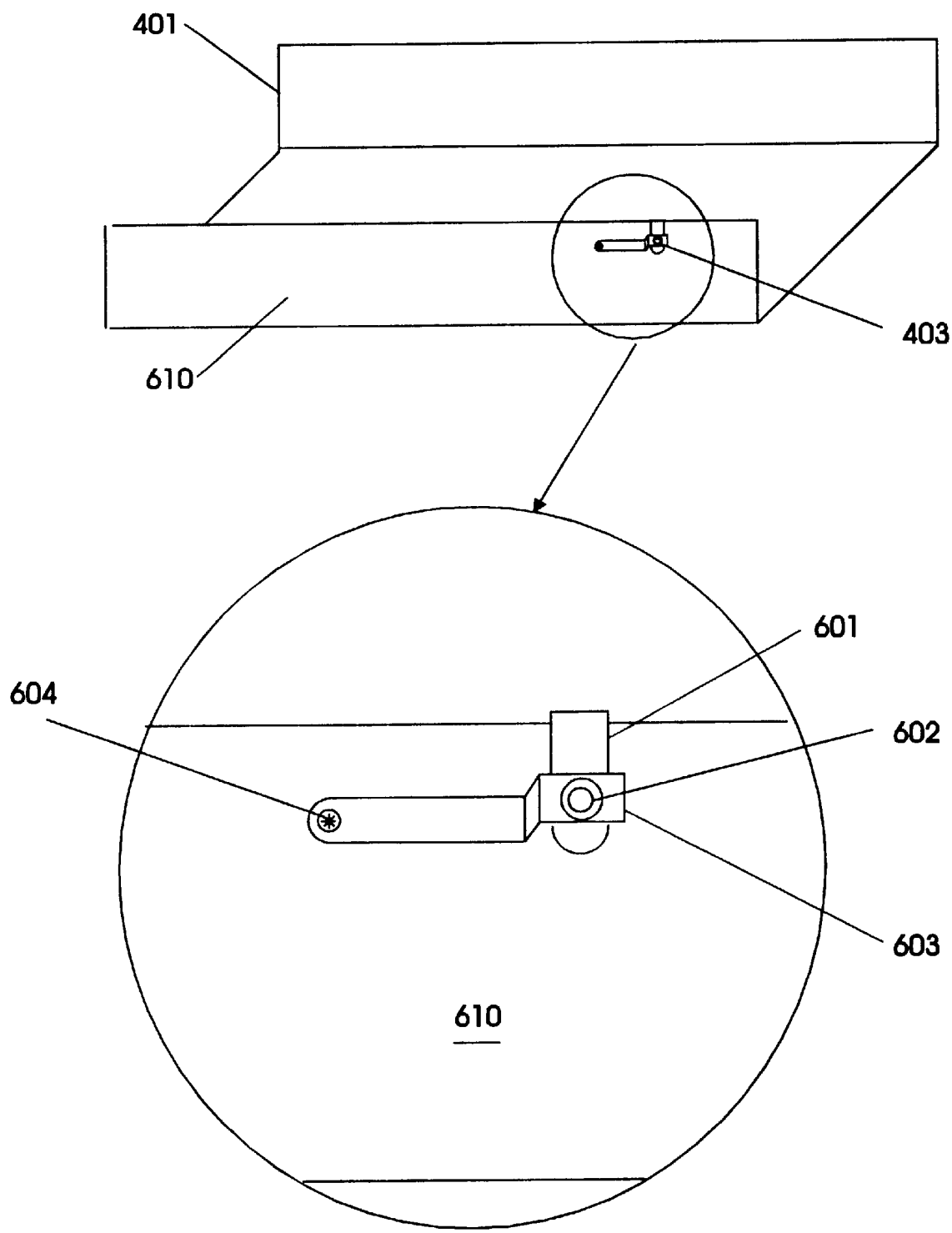

Referring next to FIG. 6, there is shown a more detailed drawing of contact probe 403. Flex circuit 601, which may be comprised of copper on polyimide, is mounted on chassis 401. A beryllium copper spring 603 is riveted to the bulkhead 610 of chassis 401 through a nylon grommet 602, which allows electrical contact between spring 603 and flex circuit 601 without shorting to chassis 401, which is grounded. Coined dimple 604 on the end of spring 603 concentrates spring force at the point of contact with labeling system 404 ensuring a low impedance electrical circuit.

Figure 5:
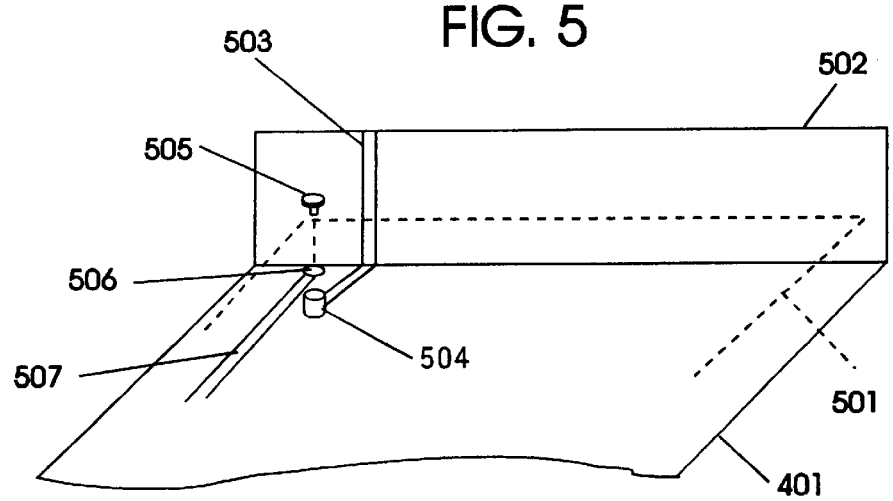

Referring next to FIG. 5, there is illustrated a view of the inside of chassis 401 showing flex circuit 503, which is coupled to flex circuit 601 shown in FIG. 6. Flex circuit 503 runs along the inside of rear bulkhead 502 of chassis 401 to mounting boss 504. Electronic card assembly 501, which may be similar to assembly 200 in FIG. 2, is mounted within chassis 401. Assembly 501 may include circuitry (not shown), which may gain access to labeling system 404 through printed circuit trace 507. Circuit trace 507 is coupled to plated through hole 506, which is coupled to boss 504 using fastener 505 when assembly 501 is mounted within chassis 401.

The spring loaded contact may be used to implement communication with read-only device 105 only when cover 402 is mounted with chassis 401 in correct alignment. In such an application, the ability to communicate with embedded read-only device 105 indicates not only identity, but also proximity, which may have physical significance.

Labeling system 404 may be utilized with other labels, such as labeling system 100 illustrated in FIGS. 2 and 3 to identify both the system as a unit and all significant subassemblies. It may further be employed to ensure the physical closure of a cover or a door.

A representative hardware environment for practicing the present invention is depicted in FIG. 7, which illustrates a typical hardware configuration of a workstation or personal computer 713 in accordance with the subject invention having central processing unit (CPU) 710, such as a conventional microprocessor, and a number of other units interconnected via system bus 712. System 713 shown in FIG. 7 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, and/or other user interface devices such as a touch screen device (not shown) to bus 712, communication adapter 734 for connecting system 713 to a data processing network, and display adapter 736 for connecting bus 712 to display device 738. CPU 710 may include other circuitry not shown herein, which will include circuitry commonly found within a microprocessor, e.g., execution unit, bus interface unit, arithmetic logic unit, etc. CPU 710 may also reside on a single integrated circuit.

Data processing system 713 may be mounted within chassis 401, and may include subassembly 200 and adapter card 300.

The present invention could easily be applied to the identification of any type of object. It distinguishes itself from passive inductively coupled devices or active radio frequency electronic labeling devices in that direct contact is required for communication with the embedded electronic device 105. Electronic storage devices could also be embedded within electronic circuit boards between laminated layers making the electronic identification tag an integral part of the printed circuit board.

Although the present invention and its advantages have been described in detail, it should be understood that various changes, substitutions and alterations can be made herein without departing from the spirit and scope of the invention as defined by the appended claims.

What is claimed is:

1. An apparatus comprising:

an electronic storage device;

an electrical connection operable for providing an electrical path to information stored in said electronic storage device; and means adaptable for adhesively affixing said electronic storage device and said electrical connection to an object in a manner so that said electrical path is broken when an attempt is made to physically tamper with said electronic storage device.

2. The apparatus as recited in claim 1, wherein said electronic storage device is a read-only device.

3. The apparatus as recited in claim 2, further comprising a first material covering said electronic storage device and said electrical connection when said electronic storage device and said electrical connection are affixed to said object, wherein said first material is adhesively affixed to said electronic storage device and said electrical connection.

4. The apparatus as recited in claim 3, further comprising a second material, wherein said electronic storage device and said electrical connection are mounted between said first and second materials, wherein said electrical connection is a flexible conductor trace, wherein said second material includes a hole therethrough to allow access to said flexible conductor trace.

5. The apparatus as recited in claim 4, wherein said flexible conductor trace is torn, breaking said electrical connection, when said second material is removed from adhesive connection to said first material.

6. The apparatus as recited in claim 3, wherein visually readable information is printed on said first material.

7. The apparatus as recited in claim 6, wherein said first and second materials are laminate materials.

8. The apparatus as recited in claim 6, wherein said visually readable information is stored in an electronic format in said electronic storage device.

9. The apparatus as recited in claim 1, wherein said object is a computer system subassembly.

10. The apparatus as recited in claim 1, wherein said object is an electronic component.

11. The apparatus as recited in claim 1, wherein said object is a computer system chassis.

12. The apparatus as recited in claim 1, wherein said electrical path is operable to provide access to said information to a circuit external to said apparatus.

13. A labeling system comprising:

an information storage device;

a conductor coupled to said information storage device, said conductor operable for electrically retrieving information stored in said information storage device; and means adaptable for adhesively affixing said information storage device to an object in a manner so that said information is not retrievable from said information storage device when said labeling system is tampered with, wherein said object is a data processing system, said labeling system further comprising:

a flexible sheet of material covering said information storage device and said conductor, wherein said flexible sheet of material is bonded to said object and said conductor with an adhesive, wherein said object is a subassembly installed in said data processing system, wherein said information storage system is coupled to circuitry on said subassembly, wherein said information storage device is coupled to a processor so that said information is retrievable by said processor.

14. A labeling system comprising:

an information storage device;

a conductor coupled to said information storage device, said conductor operable for electrically retrieving information stored in said information storage device: and means adaptable for adhesively affixing said information storage device to an object in a manner so that said information is not retrievable from said information storage device when said labeling system is tampered with, wherein said object is a data processing system, said labeling system further comprising:

a flexible sheet of material covering said information storage device and said conductor, wherein said flexible sheet of material is bonded to said object and said conductor with an adhesive, wherein said object is a chassis enclosing all or part of said data processing system, wherein said labeling system is affixed to said chassis in a manner so that said information is only retrievable when said chassis is properly assembled.

15. The labelling system as recited in claim 14, wherein when the chassis is properly assembled, said conductor is placed in electrical contact with a data path to a processor enclosed within said chassis.

16. A labeling system comprising:

a first laminate material;

an electronic read-only memory device adhesively affixed to said first laminate material;

a first flexible conductor coupled to an output signal path from said memory device, wherein said first laminate material has a first hole therethrough to allow access to said first flexible conductor;

a second flexible conductor coupled to a ground path from said memory device, wherein said first laminate material has a second hole therethrough to allow access to said second flexible conductor; and a second laminate material adhesively affixed to said first laminate material, said memory device, and said first and second flexible conductors.

17. The labeling system as recited in claim 16, wherein said labeling system is adhesively affixed to a computer system part.

18. The labeling system as recited in claim 17, wherein said first and second holes are positioned over first and second conductors on said computer system part so that circuitry on said computer system part has access to information stored in said electronic read-only memory device.

19. The labeling system as recited in claim 16, wherein said second laminate material includes visually readable information.

20. The labeling system as recited in claim 16, wherein said labeling system is affixed to an object in a manner so that information stored in said memory device is not retrievable when said labeling system is physically tampered with.

21. The labelling system as recited in claim 20, wherein when said second laminate material is removed from adhesive fixation to said first material, one or both of the flexible conductors is torn, breaking said output signal path.

22. The labelling system as recited in claim 16, wherein said output signal path is operable to provide access to information stored within said memory device to a circuit external to said labelling system.

* * * * *